(12) United States Patent
Marquis et al.

(10) Patent No.: US 11,040,762 B2
(45) Date of Patent: Jun. 22, 2021

(54) MARINE PARALLEL PROPULSION SYSTEM

(71) Applicant: Caterpillar Inc., Peoria, IL (US)

(72) Inventors: Candace L. Marquis, Crestview, FL (US); Merritt P. Callaghan, Cypress, TX (US); Adnan Kadribasic, Gothenburg (SE); Per Jonas Granath, Gothenburg (SE); Brian P. Neathery, Hockley, TX (US); Mark I. Harrison, Cypress, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/656,694

(22) Filed: Oct. 18, 2019

(65) Prior Publication Data

US 2021/0114706 A1    Apr. 22, 2021

(51) Int. Cl.
| | |
|---|---|
| *B63H 21/20* | (2006.01) |
| *B63H 25/46* | (2006.01) |
| *B63H 23/30* | (2006.01) |
| *B63H 21/21* | (2006.01) |
| *B63H 23/34* | (2006.01) |

(52) U.S. Cl.
CPC ............ *B63H 21/20* (2013.01); *B63H 21/21* (2013.01); *B63H 23/30* (2013.01); *B63H 23/34* (2013.01); *B63H 25/46* (2013.01); *B63H 2021/202* (2013.01)

(58) Field of Classification Search
CPC ........ B63H 21/14; B63H 21/20; B63H 21/21; B63H 25/46; B63H 23/30; B63H 23/34; B63H 2021/202

USPC ............. 440/1, 3, 75, 84, 86, 87, 111
See application file for complete search history.

(56) References Cited

U.S. PATENT DOCUMENTS

| | | | | |
|---|---|---|---|---|
| 4,836,809 | A | * | 6/1989 | Pelligrino ............... B63H 21/22 440/2 |
| 5,896,016 | A | * | 4/1999 | Bayer ................... B63H 21/22 318/68 |
| 8,062,081 | B2 | | 11/2011 | Barrett et al. |
| 8,353,733 | B2 | | 1/2013 | Piccolo |
| 9,028,285 | B2 | | 5/2015 | Tamba |
| 9,096,295 | B2 | | 8/2015 | Gemin et al. |
| 2010/0125383 | A1 | | 5/2010 | Caouette |
| 2010/0144219 | A1 | | 6/2010 | Balogh et al. |
| 2017/0355258 | A1 | | 12/2017 | Hawksley |
| 2018/0022419 | A1 | | 1/2018 | Hansson et al. |
| 2019/0023369 | A1 | | 1/2019 | Gjerpe et al. |
| 2019/0039707 | A1 | | 2/2019 | Ezaki et al. |

FOREIGN PATENT DOCUMENTS

CN    104149960 B    11/2014

* cited by examiner

*Primary Examiner* — Daniel V Venne (57) ABSTRACT

A propulsion system for a marine vessel having a first driveline assembly having a first engine and a first motor-generator, a second driveline assembly having a second engine and second motor-generator, and a controller configured to operate of the assemblies in a split mode. The split mode includes the first driveline assembly being driven by the first engine without torque assistance from the first motor-generator and the second driveline assembly being driven by the second motor-generator without torque assistance from the second engine and includes the first motor generator providing electrical power to the marine vessel grid for consumption.

9 Claims, 7 Drawing Sheets

MARINE PARALLEL PROPULSION SYSTEM

TECHNICAL FIELD

This disclosure relates to a marine propulsion system, and more particularly, to an electric-hybrid, parallel marine propulsion system capable of operating in various modes.

BACKGROUND

Marine propulsion systems come in a variety of forms. Conventional marine propulsion systems utilize an engine that turns a propeller via a shaft. Other marine propulsion systems may include at least one engine driving a generator and at least one propeller being driven by a motor that receives electricity from the generator via a closed circuit. The latter circuit could be open, allowing the engine/generator combination to provide at least a portion of the electrical power into the ship's electrical grid. These systems provide fuel economy via the interplay among the mechanical and electrical opponents and can be operated in a variety of operating modes.

For example, U.S. Patent Publication 2010/0144219 discloses a marine propulsion system that is configured to allow many different combinations and interconnections between three internal combustion engines, three generators, two motors, two clutches, two marine propulsion devices, and an electrical storage device. By appropriately interconnecting these devices in advantageous combinations, energy consumption can be reduced, operational efficiency of the engine can be improved, and redundancy can be provided in the event that one or more components are disabled.

SUMMARY

In accordance with one aspect of the present disclosure, a propulsion system for a marine vessel includes a first driveline assembly and a second driveline assembly. The first driveline assembly includes a first engine having a first power source shaft, a first clutch connecting the first power source shaft to a first output shaft, a first motor-generator operatively fixed to rotate with the first output shaft, and a first propulsion device connected to be driven by rotation of the first output shaft. The second driveline assembly includes a second engine having a second power source shaft, a second clutch connecting the second power source shaft to a second output shaft, a second motor-generator operatively fixed to rotate with the second output shaft, and a second propulsion device connected to be driven by rotation of the second output shaft. The propulsion system also includes a controller configured to operate the first driveline assembly and the second driveline assembly in a split mode wherein the first power source provides torque to drive the first output shaft via the first clutch without the first motor-generator providing torque to drive the first output shaft and the second motor-generator provides torque to drive the second output shaft without the second power source providing torque to drive the second output shaft, and wherein the first motor generator provides electrical power to the marine vessel for consumption by electrical devices associated with the marine vessel.

In accordance with another aspect of the present disclosure, a method of providing propulsion to a marine vessel includes operating a marine propulsion system of the marine vessel in a split operating mode. The split operating mode includes driving a first output shaft with a first engine associated with a first driveline assembly, driving a first motor-generator associated with the first driveline assembly with the first engine to generate electrical power for consumption by one or more electrical devices of the marine vessel, and driving a second output shaft with a second motor-generator associated with the second driveline assembly. A second engine associated with the second driveline assembly does not assist in driving the second output shaft.

In accordance with another aspect of the present disclosure, an arrangement of an engine, a clutch, and an electric motor for a marine propulsion system, includes an engine having a flywheel housing and an engine output shaft extending along a longitudinal axis, an electric motor having a housing defining a forward end having a first motor mounting surface and a second end opposite the first end, and a clutch assembly including a housing defining a first end having a first clutch mounting surface attached to the flywheel housing and a second end having a second clutch mounting surface attached to the first motor mounting surface. The electric motor includes a rotor fixed to rotate with a system output shaft arranged coaxially with the engine output shaft and the clutch includes a first clutch shaft fixed to rotate with the engine output shaft, a second clutch shaft fixed to rotate with the rotor of the electric motor, and an elastic coupling positioned between the first clutch shaft and the second clutch shaft. The clutch is configured to connect the first clutch shaft to the second clutch shaft for rotation together at a rotational speed greater than a cut-in speed.

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

DETAILED DESCRIPTION

While the present disclosure describes certain embodiments of a marine propulsion system, the present disclosure is to be considered exemplary and is not intended to be limited to the disclosed embodiments. Also, certain elements or features of embodiments disclosed herein are not limited to a particular embodiment, but instead apply to all embodiments of the present disclosure.

Figure 1:
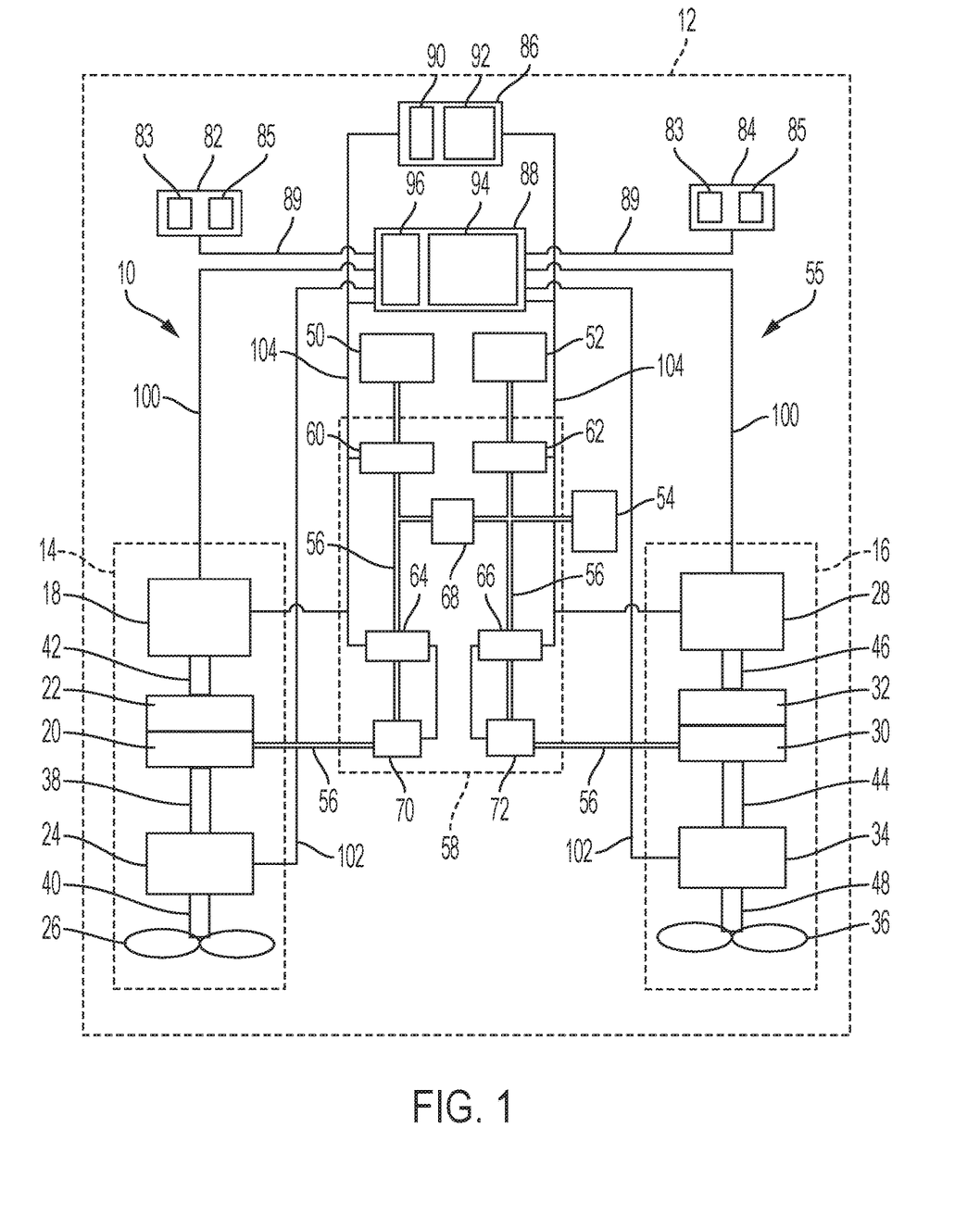
FIG. 1 is a schematic representation of an exemplary embodiment of a marine propulsion system according to the present disclosure.

FIG. 1 illustrates an exemplary embodiment of a marine propulsion system 10 for a marine vessel 12. In the illustrated embodiment, the marine propulsion system 10 is a parallel propulsion system having a first driveline assembly 14 (port side assembly) and a second driveline assembly 16 (starboard side assembly) arranged in parallel with the first driveline assembly 14. The second driveline assembly 16 may be identical to the first driveline assembly 14 or may include one or more similar or the same components. In other embodiments, however, the marine propulsion system 10 may not be a parallel propulsion system or may include more or less than two driveline assemblies.

In the exemplary embodiment, the first driveline assembly 14 includes a first power source 18, a first motor-generator 20, a first clutch 22, a first gearbox 24, and a first propulsion device 26 arranged in series. In the illustrated embodiment, the second driveline assembly 16 includes the same components as the first driveline assembly 14. Thus, the second driveline assembly 16 includes a second power source 28, a second motor-generator 30, a second clutch 32, a second gearbox 34, and a second propulsion device 36 arranged in series. The description of the components of the first driveline assembly 14 applies equally to the second driveline assembly 16. In other embodiments, however, the second driveline assembly 16 may include one or more different components from the first driveline assembly 14.

The first driveline assembly 14 is configured such that the first power source 18 drives a first output shaft 38 that drives the first propulsion device 26. The first power source 18 may be configured in a variety of ways. Any suitable power source capable of driving the first propulsion device 26 may be used. Suitable power sources may include, but not be limited to, reciprocating engines, such as diesel, gaseous (e.g. liquified natural gas), gasoline, or dual fuel engines, and turbines, such as steam, gas or nuclear-powered steam turbines. The size and configuration of the power source may also vary in different embodiments. In the illustrated embodiment, the first and the second power sources 18, 28 are internal combustion diesel engines.

The first propulsion device 26 may be configured in a variety of ways. In the illustrated embodiment, the first propulsion device 26 is a propeller, such as for example, a fixed pitch or controllable-pitch propeller that is connected to the other components of the first driveline assembly 14 by a first propeller shaft 40. The first propeller shaft 40 is connected to the first output shaft 38 by the first gearbox 24.

The first gearbox 24 may be configured in a variety of ways. For example, the size and type of the gearbox may vary in different applications. Any suitable gearbox for the specific embodiment of the driveline assembly may be used depending on the requested propeller speed. For example, in one exemplary embodiment, a reversing gearbox with ahead, neutral, and astern clutches together with a fixed pitch propeller may be used. In another exemplary embodiment, a reduction gearbox without a clutch together may be used with a controllable pitch propeller or a fixed pitch propeller may be used. If used with a fixed pitch propeller, the reversing of the propeller can be accomplished by reversing the first motor-generator 20.

The first power source 18 drives the first output shaft 38 via a first power source shaft 42 and a clutched connection to the first motor-generator 20 and the first output shaft 38. The first clutch 22 provides the clutched connection such that the first motor-generator 20 is fixed for rotation with the first output shaft 38, not with the first power source shaft 42. The first clutch 22 may be configured in a variety of ways. Any clutch that can selectively decouple the first power source shaft 42 from the first output shaft 38 and allow the first motor-generator 20 to drive the first output shaft 38 alone or in combination with the first power source 18 may be used.

In the exemplary embodiment, the first clutch 22 is a speed-controlled, automatic centrifugal clutch. Any suitable speed-controlled, automatic centrifugal clutch may be used that operatively couples the first motor-generator 20 and the first output shaft 38 such that they are not fixed for rotation with the first power source shaft 42 unless the first power source shaft 42 rotates at a speed above a cut-in speed. Thus, the first power source 18 may be decoupled or shutoff while the first output shaft 38 remains coupled to, and can be driven by, the first motor-generator 20. The cut-in speed of the first clutch 22 may vary in different embodiments. In one exemplary embodiment, the first clutch 22 couples the first power source shaft 42 to the first output shaft 38 at or above idle speed of the first power source 18.

The first motor-generator 20 may be configured in a variety of ways. Any suitable electric motor-generator capable of driving the first propulsion device 26 or the second propulsion device 36 while operating as a motor and providing power to drive, or assist driving, the second motor-generator 30 while operating as a generator, may be used. In one exemplary embodiment, the rotor shaft 158 (FIG. 7) of the first motor-generator 20 is configured to withstand the total combined torque from both the first power source 18 and the first motor-generator 20 itself. The first motor-generator 20 may operate over a large speed range. In one exemplary embodiment, the first motor-generator 20 is able to operate in a speed range from 0-2300 rpm. The first motor-generator 20 may be a single integrated motor and generator or may be a separate motor and a separate generator. In one exemplary embodiment, the first motor-generator is a permanent magnet hybrid motor.

Similar to the first driveline assembly 14, the second power source 28 drives a second output shaft 44 via a second power source shaft 46 and a clutched connection to the second motor-generator 30 and the second output shaft 44. The second propulsion device 36 may be a propeller connected to the other components of the second driveline assembly 16 by a second propeller shaft 48. The second propeller shaft 48 is connected to the second output shaft 44 by the second gearbox 34.

The marine propulsion system 10 may also include one or more electrical generation sets ("gensets"). The one or more gensets may be configured in a variety of ways. For example, any suitable size, capacity (i.e., the number of kilowatts being produced), number of gensets, and type of genset, may be used. In the illustrated embodiment, the marine propulsion system 10 includes a first genset 50 and a second genset 52. In other embodiments, however, the marine propulsion system 10 may include more or less than two gensets. In the exemplary embodiment, the first and the second gensets 50, 52 are diesel engine gensets.

The marine propulsion system 10 may also include an electrical storage device 54. The electrical storage device 54 may be configured in a variety of ways. Any device capable of storing and providing electrical power to the marine vessel 12 may be used. For example, the electrical storage device 54 may be one or more DC batteries.

The first driveline assembly 14, the second driveline assembly 16, the first genset 50, the second genset 52, and the electrical storage device 54 are electrically connected via an electrical grid 55 of the marine vessel 12, as shown by lines 56 in FIG. 1. The electrical grid 55 may, for example, include a DC bus. Thus, the electrical power provided by the first genset 50 and/or the electrical power provided by the second genset 52 can be directed to the first motor-generator 20, the second motor-generator 30, the electrical storage device 54, or some combination thereof. Likewise, the electrical power generated by the first motor-generator 20 and/or the second motor-generator 30, when in generating mode, can be directed to the electrical storage device 54 and/or to the other of the first or the second motor-generator 20, 30.

The electrical grid 55 of the marine vessel 12 also electrically connects the first genset 50, the second genset 52, the first motor-generator 20, the second motor-generator 30, and/or the electrical storage device 54 to various electrical devices and ancillary electrical systems (not shown) of the marine vessel 12, such as lights, navigation equipment, air conditioning, and other electrical devices. Thus, the first genset 50, the second genset 52, the first motor-generator 20, the second motor-generator 30, and the electrical storage device 54 may be used, alone or in combination, to power the various electrical devices.

The marine propulsion system 10 may also include various electrical components 58 configured to facilitate the transfer of electrical power between various components of the marine propulsion system 10, such as for example, from the first and second gensets 50, 52 to the first and second motor-generators 20, 30 and the electrical storage device 54 and from the first motor-generator 20 to the second motor-generator 30 and vice versa. The number and type of electrical components 58 may differ in various embodiments of the marine propulsion system 10. For example, the marine propulsion system 10 may include switches, filters, fuses, regulators, rectifiers, inverters, and other devices in order to perform normal operations related to the control and switching of electric power between the various devices shown in FIG. 1 and/or disclosed herein. In one exemplary embodiment, a power conversion module (DC to DC converter) is used to "step down" the voltage in the DC grid to support storage in the electrical storage device 54. For example, the voltage in the DC grid may be approximately 700 volts and the power conversion module reduces the voltage to approximately 12-48 volts, depending on the system. In another exemplary embodiment, a variable frequency drive (not shown) may be used to "step down" the voltage supplied from the gensets and the motor-generators (e.g., 700 volts) to any necessary voltage to support one or more of the various electrical devices and ancillary systems (e.g., 120-240 volts for air conditioning, 12-24 volts for lights, etc.).

In the illustrated embodiment, the electrical components 58 of the marine propulsion system 10 may include a first rectifier 60 associated with the first genset 50 and a second rectifier 62 associated with the second genset 52 to convert the alternating current (AC) from the first and the second gensets 50, 52 to direct current (DC), respectively. The electrical components 58 may also include a first bi-directional rectifier-inverter 64 (e.g., a variable frequency drive) associated with the first motor-generator 20 and a second bi-directional rectifier-inverter 66 associated with the second motor-generator 30 to convert the AC current from the first motor-generator 20 and the second motor-generator 30, when in generator mode, to direct current (DC), respectively. The first and second bi-directional rectifier-inverters 64, 66 also convert the DC current from the electrical storage device 54 and the DC current from the first genset 50 and the second genset 52, after having been converted to DC by the first rectifier 60 and second rectifier 62, to AC current for deliver to the first motor-generator 20 and the second motor-generator 30, respectively.

The electrical components 58 may also include one or more DC filters 68. The one or more DC filters 68 may provide several functions, such as for example, smoothing (filtering) the DC power after being converted from AC prior to supplying DC power to the electrical storage device 54 and/or various electrical devices of the marine vessel 12, such as lights, navigation equipment, air conditioning, and other electrical devices. The one or more DC filters 68 may also be used to eliminate high frequency harmonics, provide buffering for rapid power variations coming from variations in consumer loads (motor loads), and provide a discharge function to make sure that the DC voltage will be drained to zero volts after the power is turned off for safety.

The electrical components 58 may also include a first wye/delta switch 70 associated with the first motor-generator 20 and a second wye/delta switch 72 associated with the second motor-generator 30. The first wye/delta switch 70 and the second wye/delta switch 72 are configured to balance the current to the first motor-generator 20 and the second motor-generator 30, respectively, between two operational conditions: (i) when only using a motor-generator to drive an associated driveline assembly at a first threshold speed or lower (e.g., speeds of 1200 rpm or lower) and (ii) when using a motor-generator in conjunction with a power source to boost the driveline output at speeds above a second threshold speed (e.g., speeds of 2300 rpm or higher). For example, if the same power is used in both conditions, the current may be kept at the same level for both conditions by using the wye connection for the first threshold speed (e.g., 1200 rpm or lower) and using the delta connection for the second threshold speed (e.g., 2300 rpm or higher).

The first wye/delta switch 70 and the second wye/delta switch 72 change how the power from the first and second bi-directional rectifier-inverters 64, 66 are utilized in the motor windings. By using the first wye/delta switch 70 and the second wye/delta switch 72, the size/capacity of the first and the second bi-directional rectifier-inverters 64, 66 can be smaller since the first wye/delta switch 70 and the second wye/delta switch 72 are able to provide the rated current to the first and the second motor-generators 20, 30, respectively, by switching to the wye connection below the first threshold speed when using a motor-generator to drive an associated driveline assembly and using the delta connection when using a motor-generator to boost the driveline output at speeds above a second threshold speed. Thus, the first wye/delta switch 70 and the second wye/delta switch 72 improve the efficiency of the operation of the marine propulsion system 10.

The first wye/delta switch 70 and the second wye/delta switch 72 are automatically operated and controlled by the control system 88 when the operating modes are changed. In the exemplary embodiment, the first motor-generator 20 and the second motor-generator 30 are delta connected during all motor-generator conditions except for when using only the first motor-generator to drive the first driveline assembly 14 at speeds at or below the first threshold speed (e.g., 1200 rpm or lower) and when using only the second motor-generator 30 to drive the second driveline assembly 16 at speeds at or below the first threshold speed.

In other embodiments, however, the marine propulsion system 10 may not use wye/delta switches or may use the delta connection in all operating conditions. For example, in some embodiments, larger first and second bi-directional rectifier-inverters 64, 66 can be selected that have the capability to deliver the rated current at both low and high motor rotational speed. With the larger first and second bi-directional rectifier-inverters 64, 66, a direct connection can be used between the first bi-directional rectifier-inverter 64 and the first motor-generator 20 and between the second bi-directional rectifier-inverter 66 and the second motor-generator 30 and the wye/delta switches can be omitted.

The marine propulsion system 10 also includes a first operator control 82, a second operator control 84, a user interface 86, and a control system 88 for the marine propulsion system 10. The first operator control 82 and the second operator control 84 may be configured in a variety of ways. Any control device or devices capable of providing a signal indicative of the desired power output (e.g., 0-100% output) and the desired directional output (e.g., forward or reverse) for a driveline assembly may be used. Each of the first and the second operator control 82, 84 may be, for example, one or more levers, knobs, handles, joysticks, or other devices configured to receive operator input regarding the desired power output and directional output for the driveline assemblies.

In one exemplary embodiment, the first operator control 82 and the second operator control 84 are redundant operator input stations with full system control from each station and may be located at different physical locations throughout the vessel 12. Thus, the first operator control 82 and the second operator control 84 can independently control both the first driveline assembly 14 and the second driveline assembly 16.

In one exemplary embodiment, the first operator control 82 and the second operator control 84 each include a first input device 83, such as a lever, for controlling the first driveline assembly 14 and a second input device 85, such as a lever, for controlling the second driveline assembly 16. Each of the first input device 83 and the second input device 85 are movable through a range between a first position indicative of 0% power output and a second position indicative of 100% power output for the first driveline assembly 14 and the second driveline assembly 16, respectively. The first operator control 82 and the second operator control 84 may also include one or more buttons, switches, toggles, or the like that allow the operator to select one or more operating modes for the marine propulsion system. The first and second operator controls 82, 84 are communicatively coupled to the control system 88, as shown by lines 89 in FIG. 1, to provide signals to the control system 88 regarding the desired power output of each of the driveline assemblies.

The user interface 86 may be configured in a variety of ways. The user interface 86 may include one or more inputs 90 and one or more displays 92 for displaying information related to the operation of the marine propulsion system 10. The one or more inputs 90 may be any type of input device(s) and the one or more displays 92 may also be any type of known display device(s). In some embodiments, one or more of the inputs 90 and one or more of the displays 92 may be combined into a single device, such as for example, a touchscreen or the like. The one or more displays 92 may be configured to display a variety of information related to the operation of the marine propulsion system 10, such as for example, the power/torque/speed output percentage of the first and second power sources 18, 28, the power/torque/speed output percentage of the first and second motor-generators 20, 30, the operating mode the marine propulsion system 10 is currently in, various operational parameters, limits, alarms, and warnings, and any other useful information to be displayed to the operator. The inputs 90 may be configured for a variety of functions, such as for example, to allow an operator to select an operational mode or respond to the information being provided.

As shown by lines 89 in FIG. 1, the user interface 86 may be communicatively coupled to the control system 88 and various components of the marine propulsion system 10, such as the first power source 18, the second power source 28, the first rectifier 60, the second rectifier 62, the first bi-directional rectifier-inverter 64 associated with the first motor-generator 20 and a second bi-directional rectifier-inverter 66 the provide signals to the control system 88 regarding the desired power output of each of the associated driveline assemblies.

The control system 88 is configured to control and monitor the operation of the marine propulsion system 10. The control system 88 may be configured in a variety of ways. In the illustrated embodiment, the control system 88 includes a controller 94 and a memory 96. The controller 94 may embody a single microprocessor or multiple microprocessors configured to receive signals from the various components of the marine propulsion system 10. A person of ordinary skill in the art will appreciate that the control system 88 may additionally include other components and may also perform other functions not described herein. The controller 94 may also be configured to receive inputs from an operator via the first operator control 82, the second operator control 84, and the one or more inputs 90.

The memory 96 may include information regarding one or more parameters of the marine propulsion system 10. Further, the controller 94 may be configured to refer to the information stored in the memory 96. The memory 96 may also be configured to store various information determined by the controller 94. In some embodiments, the memory 96 may be integral to the controller 94. The memory 96 may be a read only memory (ROM) for storing a program or programs, a random access memory (RAM) which serves as a working memory area for use in executing the program(s) stored in the memory 96, or a combination thereof. Alternatively, the memory 96 may be external to the controller 94 and/or the control system 88.

The control system 88 may be used to operate the marine propulsion system 10 in a plurality of operating modes. The specific programming of the control system 88 and the controller 94 is within the understanding of those skilled in the art, and a detailed discussion of the programming methods is not provided herein.

The controller 94 may be communicatively coupled to various portions of the marine propulsion system 10 to send signals to, and receive signals from, those portions. For example, FIG. 1 illustrates the controller 94 communicatively coupled to the first power source 18 and the second power source 28 by lines 100, to the first gearbox 24 and the second gearbox 34 by lines 102, and to the user interface 86, the first rectifier 60, the second rectifier 62, the first bi-directional rectifier-inverter 64, and a second bi-directional rectifier-inverter 66 by lines 104.

Figure 2:
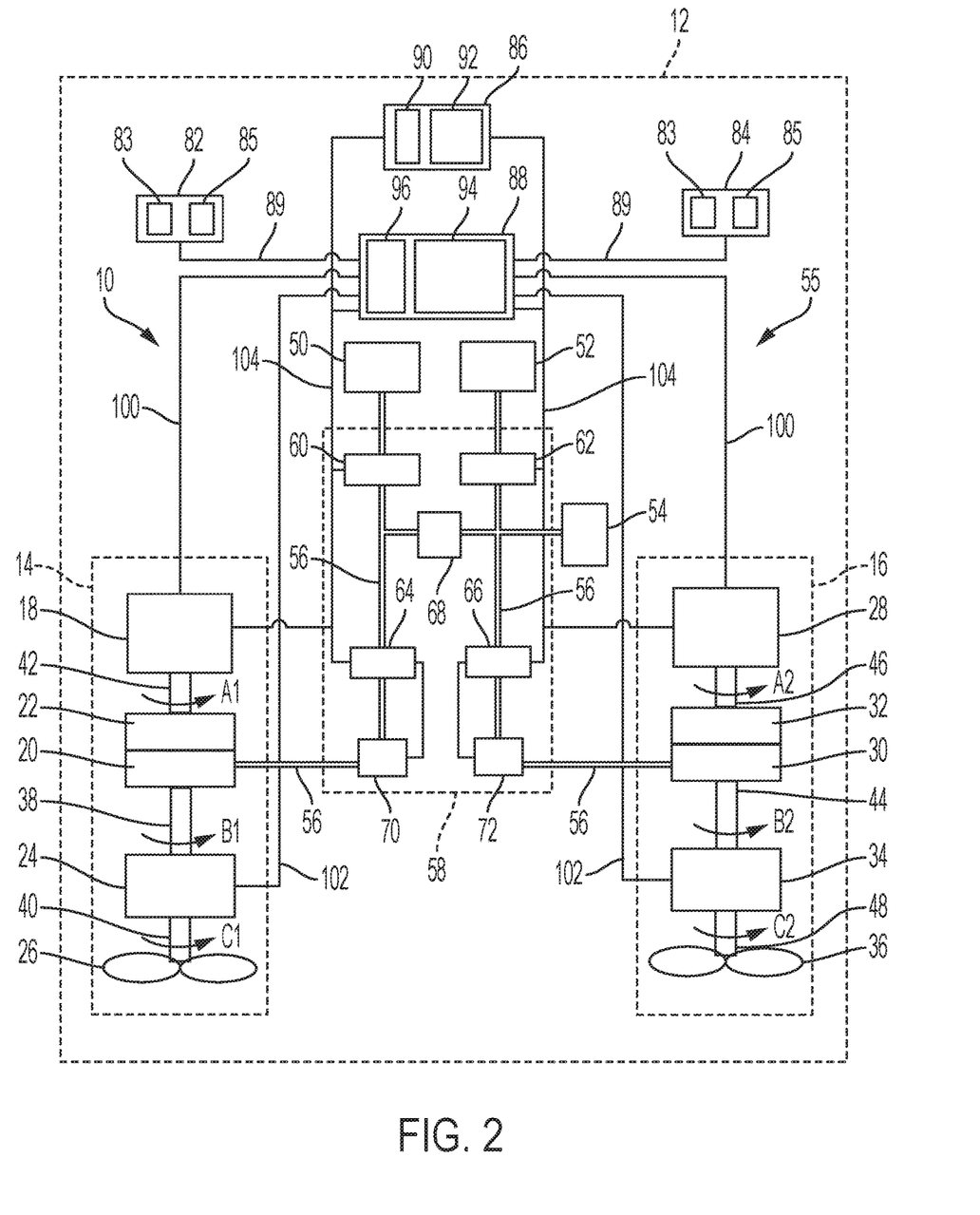
FIG. 2 is a schematic representation of the marine propulsion system of FIG. 1 illustrated operating in a first mode.

The controller 94 is configured to operate the marine propulsion system 10 in a plurality of different operating modes, including, as illustrated in FIG. 2, a first mode in which the first propulsion device 26 and the second propulsion device 36 are driven only by the first power source 18 and the second power source 28, respectively. In the first mode, the first power source 18 rotates the first power source shaft 42 (arrow A1), which rotates the first output shaft 38 via the first clutch 22 (as shown by arrow B1), which rotates the first propeller shaft 40 via the first gearbox 24 (as shown by arrow C1), and which rotates the first propulsion device 26 via the first propeller shaft 40.

When the first power source shaft 42 exceeds the cut-in rotational speed of the first clutch 22, the first clutch 22 engages the first motor-generator 20 such that the rotor 154 (FIG. 7) of the first motor-generator 20 rotates with the first power source shaft 42. In the first mode, however, the first motor-generator 20 does not generate any torque to assist rotating the first output shaft 38 and also does not generate power for storage or consumption by another electrical device. The first motor-generator 20 can be set to rotate without producing energy to the marine propulsion system 10 in multiple ways. For example, the first wye/delta switch 70 can be configured to have three conditions: wye connection, delta connection, and open circuit. Thus, the first wye/delta switch 70 can effectively disconnect the electrical connection to the stator 156 (FIG. 7) of the first motor-generator 20 by switching to the open condition. The first motor-generator 20 can also be set to rotate without producing energy, for example, by not activating the first bi-directional rectifier-inverter 64 or by having no electrical devices extract power from the first motor-generator 20.

In the first mode, the controller 94 is configured to associate the first position of the first operator control 82 with 0% throttle of the first power source 18 and the second position of the first operator control 82 with 100% throttle of the first power source 18.

The second driveline assembly 16 operates in the same manner as the first driveline assembly 14. In particular, the second power source 28 rotates the second power source shaft 46 (as shown by arrow A2), which rotates the second output shaft 44 via the second clutch 32 (as shown by arrow B2), which rotates the second propeller shaft 48 via the second gearbox 34 (as shown by arrow C2), and which rotates the second propulsion device 36 via the second propeller shaft 48. The rotor 154 of the second motor-generator 30 rotates with the second power source shaft 46, but the second motor-generator 30 does not generate any torque to assist rotating the second output shaft 44 and also does not generate power for storage or consumption by another electrical device.

Figure 3:
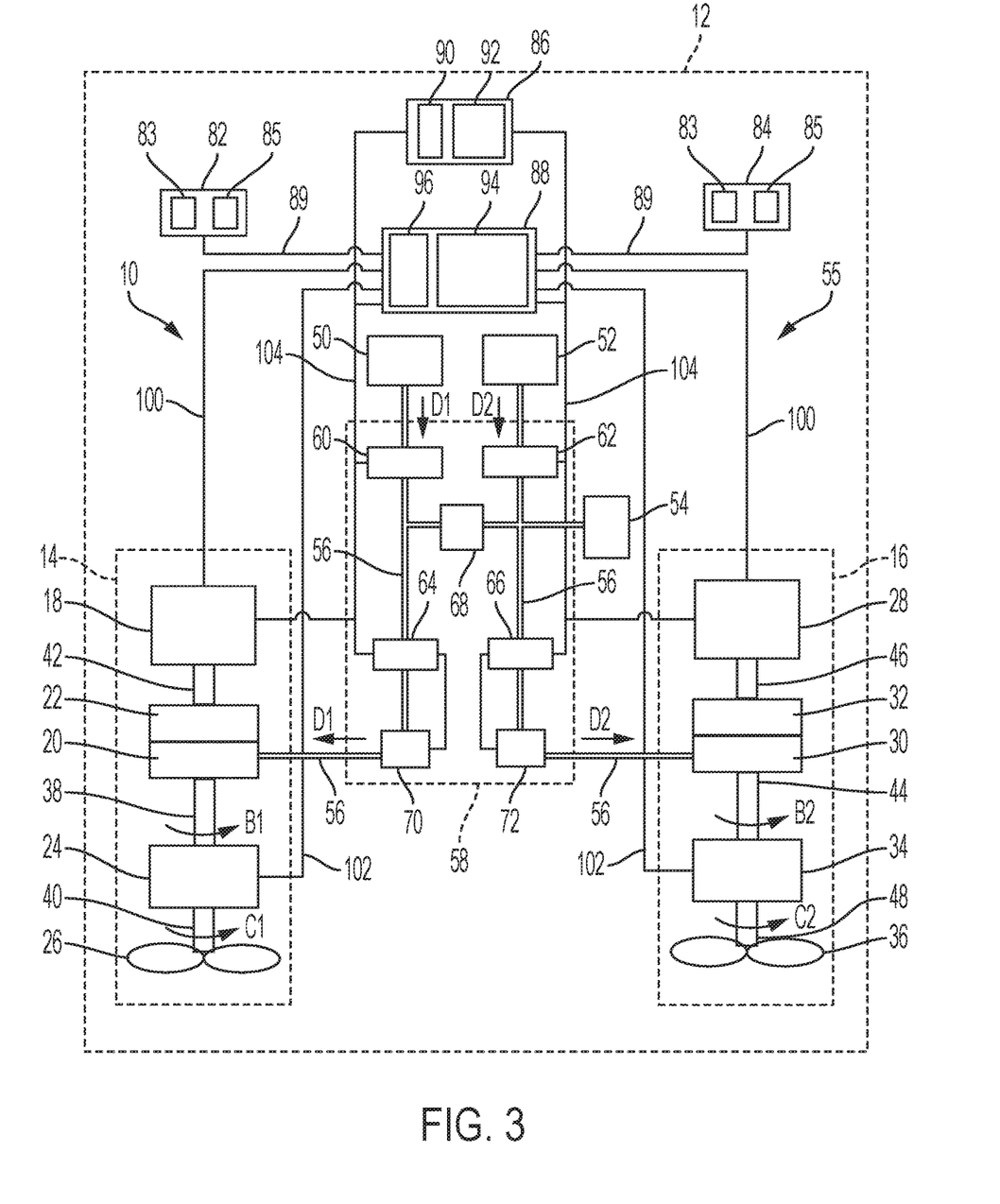
FIG. 3 is a schematic representation of the marine propulsion system of FIG. 1 illustrated operating in a second mode.

The marine propulsion system 10 can also operate in a second mode, as illustrated in FIG. 3, in which the first propulsion device 26 and the second propulsion device 36 are driven only by the first motor-generator 20 and the second motor-generator 30, respectively. In the second mode, the first power source 18 and the second power source 28 are not operating. The first motor-generator 20 rotates the first output shaft 38 (as shown by arrow B1), which rotates the first propeller shaft 40 via the first gearbox 24 (as shown by arrow C1), and which rotates the first propulsion device 26 via the first propeller shaft 40.

The first motor-generator 20 receives power from the first genset 50 (as shown by arrows D1) to energize the first motor-generator 20 to rotate the first output shaft 38. The first motor-generator 20 may also receive power from either, or both, the second genset 52 or the electrical storage device 54. The AC power generated by the first genset 50 is converted to DC power by the first rectifier 60 and converted back to AC power by the first bi-directional rectifier-inverter 64. Converting the AC power from the genset to DC power and then converting it back to AC power allows for control of the speed and power levels of the first motor-generator 20 by regulating the AC waveform coming the first genset 50. The AC power via the first bi-directional rectifier-inverter 64 is then used to energize the windings (not shown) of the first motor-generator 20 to drive the rotor 154 and the first output shaft 38. Likewise, in the alternative, or in combination with the first genset 50, DC power from the electrical storage device 54 can be converted to AC power by the first bi-directional rectifier-inverter 64 and supplied to the first motor-generator 20.

As discussed above regarding the first clutch 22, the rotor 154 of the first motor-generator 20 is fixed to rotate with the first output shaft 38, not with the first power source shaft 42. Thus, the first motor-generator 20 and the first output shaft 38 are able to rotate without subjecting the first output shaft 38 to drag caused by the first power source 18 (e.g., drag caused by engine braking).

The second driveline assembly 16 operates in the same manner as the first driveline assembly 14. In particular, the second motor-generator 30 rotates the second output shaft 44 (as shown by arrow B2), which rotates the second propeller shaft 48 via the second gearbox 34 (as shown by arrow C2), and which rotates the second propulsion device 36 via the second propeller shaft 48. The second motor-generator 30 receives power from the second genset 52 (as shown by arrows D2) to rotate the second output shaft 44. The second motor-generator 30 may also receive power from either or both the first genset 50 or the electrical storage device 54. The AC power generated by the second genset 52 is converted to DC power by the second rectifier 62 and converted back to AC power by the second bi-directional rectifier-inverter 66.

The AC power via the second bi-directional rectifier-inverter 66 and second wye/delta switch 72 is then used to energize the windings (not shown) of the second motor-generator 30 to drive the rotor 154 and the second output shaft 44. Likewise, in the alternative, or in combination with the second genset 52, the DC power from the electrical storage device 54 can be converted to AC power by the second bi-directional rectifier-inverter 66 and supplied to the second motor-generator 30.

As discussed above regarding the second clutch 32, the rotor 154 of the second motor-generator 30 is fixed to rotate with the second output shaft 44, not with the second power source shaft 46. Thus, the second motor-generator 30 and the second output shaft 44 are able to rotate without subjecting the second output shaft 44 to drag caused by the second power source 28 (e.g., drag caused by engine braking).

In the second mode, the controller 94 rescales the range of the first operator control 82 and the second operator control 84 to correspond to the optimal speed range of the first and second motor-generators 20, 30, rather than the throttle range of the first and second power sources 18, 28. Thus, the first position of the first operator control 82 and the first position of the second operator control 84 correspond to zero rotational speed (0% in the speed range) of the first motor-generator 20 and the second motor-generator 30, respectively. Further, the second position of the first operator control 82 and the second position of the second operator control 84 correspond to the maximum allowed motor speed (100% in the speed range) of the first motor-generator 20 and the second motor-generator 30, respectively. The maximum allowed motor speed may be the maximum speed of the motor or a lower speed, as desired by the end user.

Figure 4:
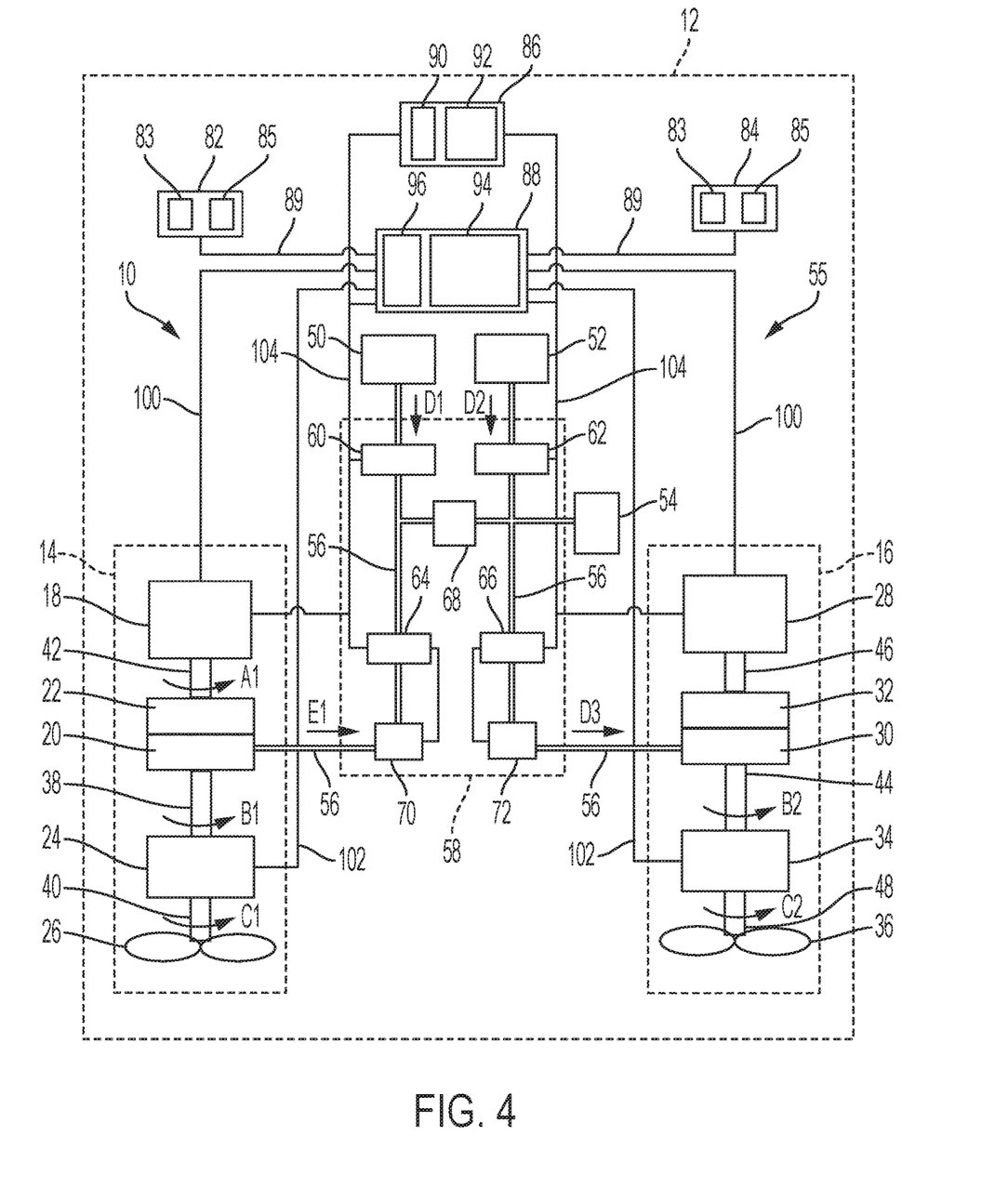
FIG. 4 is a schematic representation of the marine propulsion system of FIG. 1 illustrated operating in a third mode.

The marine propulsion system 10 can also operate in a third mode in which one of the driveline assemblies 14, 16 is driven by its power source while the other driveline assembly is driven by its motor-generator. In the third mode, only one of the first power source 18 or the second power source 28 is operating. The third mode can operate with either the first driveline assembly 14 (port side) or the second driveline assembly 16 (starboard side) being driven by its power source, while the other driveline assembly is driven by its motor-generator and its power source is not operating. Furthermore, the motor-generator of the driveline assembly that is being driven by its power source can be used as a generator to power the other motor-generator that is being used to drive the other driveline assembly and/or supply power to the electrical storage device 54 or to various electric devices of the marine vessel 12.

When the marine propulsion system 10 is operating in the third mode (port side), as shown in FIG. 4, the first power source 18 rotates the first power source shaft 42 (as shown by arrow A1), which rotates the first output shaft 38 via the first clutch 22 (as shown by arrow B1), which rotates the first propeller shaft 40 via the first gearbox 24 (as shown by arrow C1), and which rotates the first propulsion device 26 via the first propeller shaft 40. When the first power source shaft 42 exceed the cut-in rotational speed of the first clutch 22, the first clutch 22 engages the first motor-generator 20 such that the rotor 154 of the first motor-generator 20 rotates with the first power source shaft 42. In the third mode, the first motor-generator 20 is operating as a generator to produce power for consumption by the vessel 12. Thus, instead of providing torque to the first output shaft 38 or rotating without producing energy, the first motor-generator 20 generates AC power that is sent to the electrical grid 55 (as shown by arrow E1) for consumption by other electric devices of the marine vessel 12, such as for example, the second motor-generator 30.

The AC power from the first motor-generator 20 is converted to DC power by the first bi-directional rectifier-inverter 64. In the exemplary embodiment, the first wye/delta switch 70 is set for the first motor generator 20 to be delta connected when the first motor-generator 20 is operating as a generator. In other embodiments, however, the first wye/delta switch may be set for the first motor generator 20 to be wye connected when operating as a generator at speeds less the first threshold speed (e.g., 1200 rpm) and delta connected at speeds greater than the first threshold speed. The DC power is then filtered by the one or more of the DC filters 68. The DC power may then be "stepped down" to any necessary voltage to facilitate the DC power being stored in the electrical storage device 54 or used to power various electrical devices of the marine vessel 12, such as lights, navigation equipment, air conditioning, etc.

The DC power via the first bi-directional rectifier-inverter 64 may also be used directly via the DC bus to power the second motor-generator 30 with using an intermediate electrical storage device, such as the electrical storage device 54 to store the power. When used to power the second motor-generator 30, the DC power is converted back to AC power by the second bi-directional rectifier-inverter 66. The AC power via the second bi-directional rectifier-inverter 66 is then used to energize the windings (not shown) of the second motor-generator 30 (as shown by arrow D3) to drive the rotor 154 and the second output shaft 44 (as shown by arrow B2), which rotates the second propeller shaft 48 via the second gearbox 34 (as shown by arrow C2), and which rotates the second propulsion device 36 via the second propeller shaft 48.

In addition to, or alternatively, the first genset 50 and/or the second genset 52 may provide power to drive the second motor-generator 30 (as shown by arrows D1 and D2, respectively). The AC power generated by the first genset 50 and/or the second genset 52 is converted to DC power by the first rectifier 60 and the second rectifier 62, respectively, and converted back to AC power by the second bi-directional rectifier-inverter 66. The AC power via the second bi-directional rectifier-inverter 66 is then used to energize the windings (not shown) of the second motor-generator 30 (as shown by arrow D3) to drive the rotor 154 and the second output shaft 44 (as shown by arrow B2).

In the illustrated third mode, the controller 94 is configured to associate the first position of the first input device 83 with 0% throttle of the first power source 18 and the second position of the first input device 83 with 100% throttle of the first power source 18. The controller 94, however, rescales the range of the second input device 85 to correspond to the power range of the second motor-generator 30. Thus, the first position of the second input device 85 corresponds to zero rotational speed of the second motor-generator 30 and the second position of the second input device 85 corresponds to maximum allowed speed of the second motor-generator 30.

As mentioned above, the marine propulsion system 10 can also operate where the second power source 28 drives the second propulsion device 36 and the first motor-generator 20 drives the first propulsion device 26 (i.e., third mode starboard side). The manner in which the marine propulsion system 10 operates in the third mode starboard side is the same as in the third mode port side except the second power source 28 is driving the second driveline assembly 16, the second motor-generator 30 is operating as a generator to supply power to the electrical grid 55 for consumption, the first motor-generator 20 is driving the first driveline assembly 14 from power received by one of, or a combination of, the second motor-generator 30, the first genset 50, the second genset 52, or the electrical storage device 54, and the first power source 18 is not operating.

Figure 5:
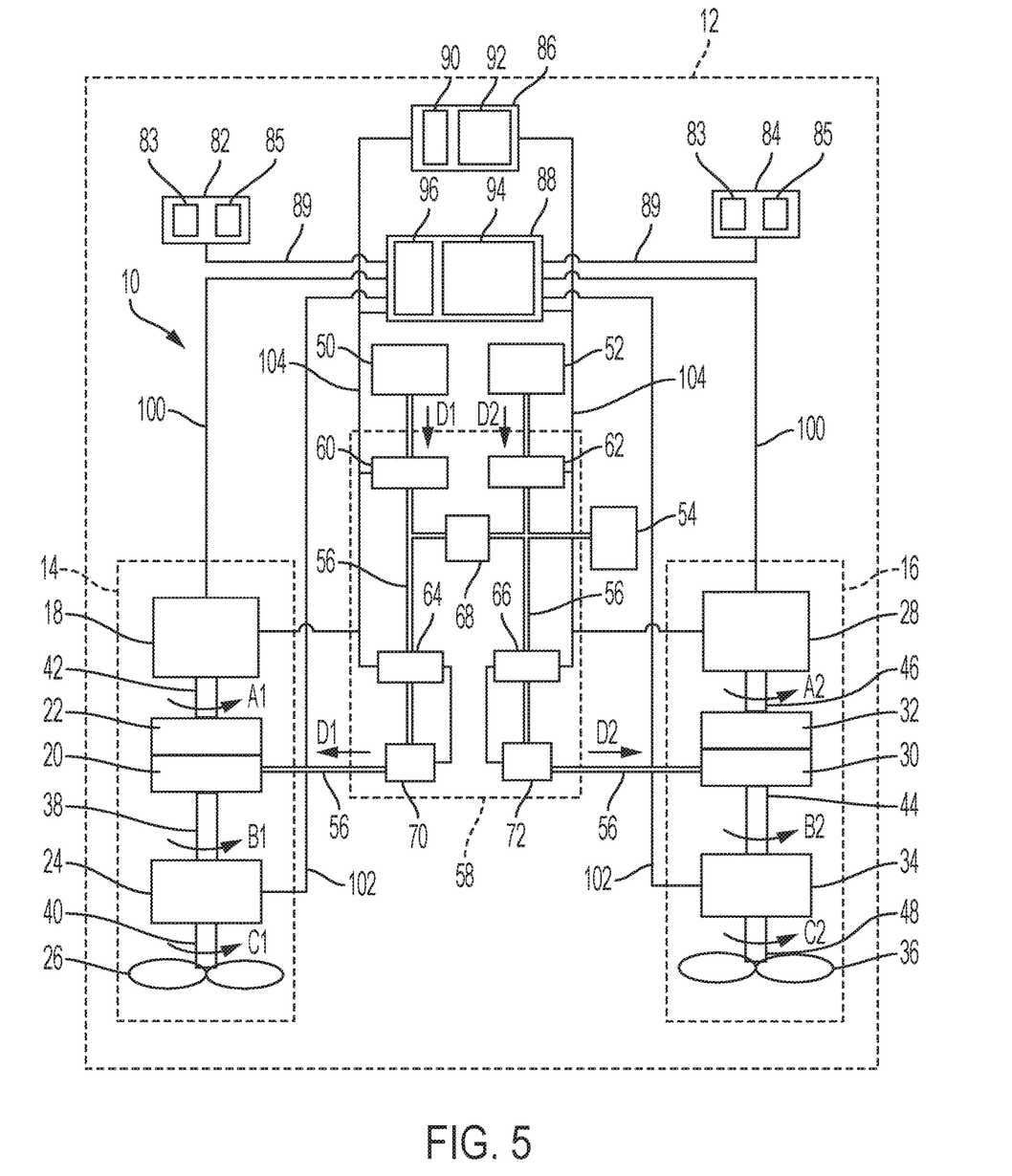
FIG. 5 is a schematic representation of the marine propulsion system of FIG. 1 illustrated operating in a fourth mode.

The marine propulsion system 10 can also operate in a fourth mode, as shown in FIG. 5. In the fourth mode, both the power source and the motor-generator in one, or both, of the driveline assemblies provide torque to the output shafts. The power source may be utilized as the primary driving force of the propulsion device, with the motor-generator being selectively used to provide additional torque in certain situations, such as for example, during acceleration of the vessel (accel assist mode) or to boost the top end speed of the vessel (boost mode).

In both the accel assist mode and the boost mode, the first power source 18 rotates the first power source shaft 42 (as shown by arrow A1), which rotates the first output shaft 38 via the first clutch 22 (as shown by arrow B1), which rotates the first propeller shaft 40 via the first gearbox 24 (as shown by arrow C1), and which rotates the first propulsion device 26 via the first propeller shaft 40. When the first power source shaft 42 exceed the cut-in rotational speed of the first clutch 22, the first clutch 22 engages the first motor-generator 20 such the rotor 154 of the first motor-generator 20 rotates with the first power source shaft 42. The windings (not shown) of the first motor-generator 20, are selectively energized such that the first motor-generator 20 provides additional torque to the first output shaft 38 in certain situations and rotates without producing torque to assist rotating the first output shaft 38 when not desired.

In both the accel assist mode and the boost mode, the control system 88 is able to adjust torque based on the speed to optimize the torque output for a given speed. For example, the control system 88 can command 100% torque capabilities of the first motor-generator 20 across the entire speed range if system optimization determines that is the optimal configuration. In one embodiment, the control system 88 rescales the range of the first input device 83 and the second input device 85 such that the first input device 83 and the second input device 85 are controlling both the throttle of the first power source 18 and the amount of added torque from the first motor-generator 20.

When desired, the first motor-generator 20 receives power from the first genset 50 (as shown by arrows D1) to energize the first motor-generator 20 to assist in rotating the first output shaft 38. The first motor-generator 20 may also receive power from either or both the second genset 52 or the electrical storage device 54. The AC power generated by the first genset 50 is converted to DC power by the first rectifier 60 and converted back to AC power by the first bi-directional rectifier-inverter 64. The AC power via the first bi-directional rectifier-inverter 64 is then used to energize the windings (not shown) of the first motor-generator 20 to drive the rotor 154 and provide torque to the first output shaft 38. Likewise, in the alternative, or in combination with the first genset 50, DC power from the electrical storage device 54 can be converted to AC power by the first bi-directional rectifier-inverter 64 and supplied to the first motor-generator 20.

The first wye/delta switch 70, which is positioned between the first motor-generator 20 and the first bi-directional rectifier-inverter 64, switches such that at lower speeds (such as during start-up), the motor windings (not shown) of the first motor-generator 20 are wye connected to provide less voltage and higher current to the first motor-generator 20 and at higher speeds are delta connected to provide more voltage and less current.

The second driveline assembly 16 operates in the same manner as the first driveline assembly 14. In particular, the second power source 28 rotates the second power source shaft 46 (as shown by arrow A2), which rotates the second output shaft 44 via the second clutch 32 (as shown by arrow B2), which rotates the second propeller shaft 48 via the second gearbox 34 (as shown by arrow C2), and which rotates the second propulsion device 36 via the second propeller shaft 48. When the first power source shaft 42 exceeds the cut-in rotational speed of the first clutch 22, the first clutch 22 engages the first motor-generator 20 such the rotor 154 of the first motor-generator 20 rotates with the first power source shaft 42. The windings (not shown) of the first motor-generator 20 are selectively energized such that the first motor-generator 20 provides additional torque to the first output shaft 38 in certain situations and does not generate any torque to assist rotating the first output shaft 38 when not desired.

When desired, the second motor-generator 30 receives power from the second genset 52 (as shown by arrows D2) to energize the second motor-generator 30 to assist in rotating the second output shaft 44. The second motor-generator 30 may also receive power from either, or both, of the first genset 50 and the electrical storage device 54. The AC power generated by the second genset 52 is converted to DC power by the second rectifier 62 and converted back to AC power by the second bi-directional rectifier-inverter 66. The AC power via the second bi-directional rectifier-inverter 66 is then used to energize the windings (not shown) of the second motor-generator 30 to drive the rotor 154 and provide torque to the second output shaft 44. Likewise, in the alternative, or in combination with the second genset 52, DC power from the electrical storage device 54 can be converted to AC power by the second bi-directional rectifier-inverter 66 and supplied to the second motor-generator 30.

The second wye/delta switch 72, which is positioned between the second motor-generator 30 and the second bi-directional rectifier-inverter 66, switches such that at lower speeds (such as during start-up), the motor windings (not shown) of the second motor-generator 30 are wye connected to provide less voltage and higher current to the second motor-generator 30 and at higher speeds are delta connected to provide more voltage and less current.

Figure 6:
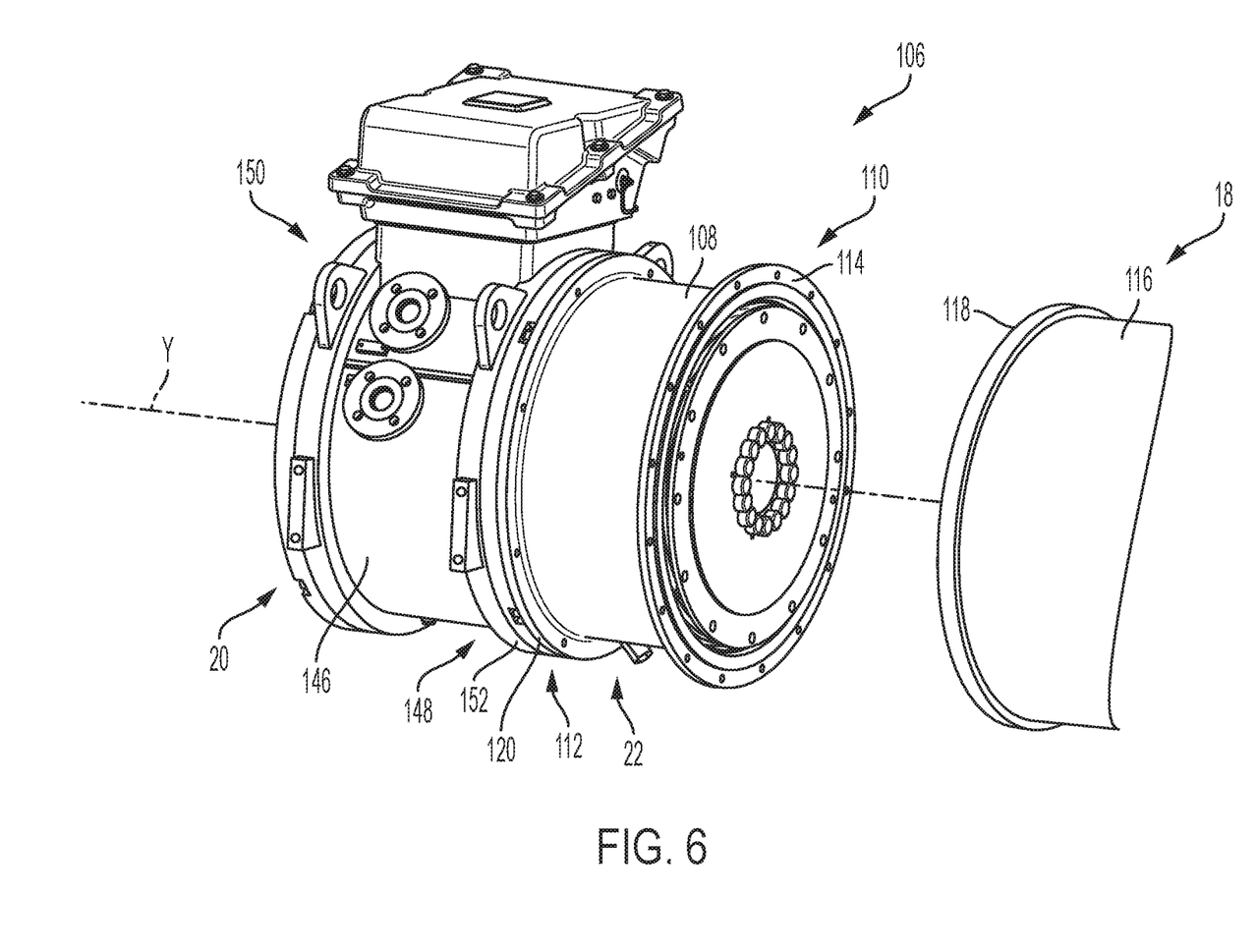
FIG. 6 is a perspective view of an exemplary embodiment of a power source, a clutch, and a motor-generator assembly of the marine propulsion system.
Figure 7:
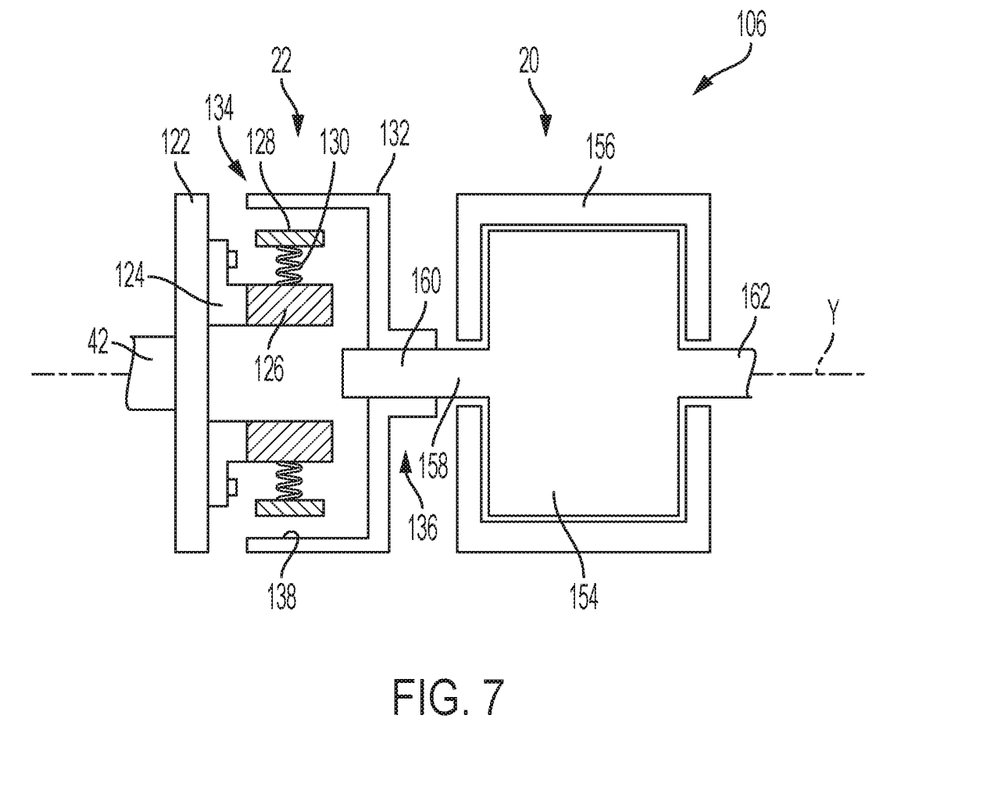
FIG. 7 is a schematic representation of the assembly of FIG. 6

Referring to FIGS. 6-7, an exemplary embodiment of an arrangement 106 of the first power source 18, the first clutch 22, and the first motor-generator 20 is illustrated. The second power source 28, the second clutch 32, and the second motor-generator 30 (e.g., FIG. 1) may be arranged identically, thus the description of the arrangement 106 applies equally to the arrangement of the second power source 28, the second clutch 32, and the second motor-generator 30.

The first clutch 22 includes a clutch housing 108 having a first end 110 and a second end 112. The first end 110 includes a first mounting surface 114, such as for example, a first annular flange, configured to mount directly to the first power source 18. For example, the first power source 18 may be a diesel engine having a flywheel housing 116 that includes a flywheel housing mounting surface 118 configured to mate against the first mounting surface 114 on the clutch housing 108. The second end 112 includes a second mounting surface 120, such as for example, a second annular flange.

In the illustrated embodiment of FIG. 7, the first clutch 22 is a centrifugal clutch. The first power source shaft 42 of the first power source 18 is attached to a flywheel 122. Within the clutch housing 108, the first clutch 22 may include a first shaft 124 that is fixably attached to the flywheel 122 for rotation therewith. The first shaft 124 extends along a longitudinal axis A and may include an elastic coupling 126, such as for example, a torsional vibration coupling, attached to the first shaft 124. The first clutch 22 further includes a plurality of clutch pads 128 that are mounted to the first shaft 124 via the elastic coupling 126 by the springs 130 or another suitable biasing device.

Positioned radially outward from the plurality of clutch pads 128 is a rotatable second shaft 132 arranged concentrically with the first shaft 124. The second shaft 132 has a first end 134 and a second end 136. The first end 134 includes a cylindrical inner surface 138 and has a diameter that is greater than a diameter of the second end 136. The clutch pads 128 and springs 130 are configured such that at a specific cut-in rotational speed of the first shaft 124, the clutch pads 128 radially extend by means of centrifugal force, against the bias of the springs 130, to engage the inner surface 138 of the first end 134. Once engaged by the clutch pads 128, the second shaft 132 rotates with the first shaft 124.

As shown in FIG. 6, the first motor-generator 20 includes a motor housing 146 having a first end 148 and a second end 150 opposite the first end 148. The first end 148 includes a first motor mounting surface 152, such as for example, a first annular flange, configured to mount directly to the second mounting surface 120 of the first clutch 22. Referring to FIG. 7, the first motor-generator 20 includes a rotor 154 rotatably mounted within a stator 156. The rotor 154 includes a rotor shaft 158 having a first end 160 and a second end 162 opposite the first end 160. The first end 160 of the rotor shaft 158 is fixably attached to the second end 136 of the second shaft 132 and the second end 162 of the rotor shaft 158 is fixably attached to the first output shaft 38 (FIG. 1).

Thus, the first power source 18, the first clutch 22, including the elastic coupling 126, and the first motor-generator 20 are configured as an in-line, compact arrangement 106, aligned along longitudinal axis Y.

INDUSTRIAL APPLICABILITY

The disclosed marine propulsion system 10 may be used in a wide variety of marine applications. While the exemplary embodiments of the marine propulsion system 10 are illustrated as a dual driveline, parallel propulsion system, it will be understood that inventive aspects of the disclosed marine propulsion system 10 may be used in propulsion systems having more than or less than two driveline assembly and other than parallel arrangements.

In the illustrated embodiment of the marine propulsion system 10, the first driveline assembly 14 and the second driveline assembly 16 may be operated in a variety of modes that allow for optimal flexibility and reduced fuel consumption, reduced engine noise, and reduced operational time of the power sources (e.g., diesel engines). To this end, the marine propulsion system 10 includes a first driveline assembly that includes a first power source and a first motor-generator, each able to drive a first propulsion device either independently or in tandem, and a second driveline assembly that includes a second power source and a second motor-generator, each able to drive a second propulsion device either independently or in tandem.

For example, in the first mode, the marine propulsion system 10 operates in a conventional manner in which the first power source drives the first propulsion device and the second power source drives the second propulsion device. In the second mode, the marine propulsion system 10 can realize significant reduction in fuel consumption and noise running in an electric-only mode in which the first and the second power sources are not operating and the first motor-generator drives the first propulsion device and the second motor-generator drives the second propulsion device. One or more gensets may be utilized to power the first and the second motor-generators.

In the third mode, the marine propulsion system operates in split mode in which one driveline assembly is driven the its power source and the other driveline assembly is driven by its motor-generator. As a result, the marine propulsion system 10 can reduce fuel consumption and noise while still utilizing a diesel engine, for example, to provide some of the propulsion driving force. In the third mode, the motor-generator that is not driving a propulsion device may be used as a generator to provide electrical power to the marine vessel's grid for consumption, including, for example, using the electrical power to drive the motor-generator of the other driveline assembly.

In the fourth mode, the motor-generators of each of the driveline assembly may selectively provide additional torque to drive the propulsion devices in select situations. For example, the motor-generators may be used in tandem with the power sources to provide higher torque or maximum speed of the driveline assembly. The motor-generators may also be used to add additional torque when rapid acceleration is needed, such as for example at take-off or low speed maneuvering.

In some embodiments of the marine propulsion system 10, wye/delta switches are associated with each of the motor-generators. For optimal operation, the motor-generators require higher current at lower motor speeds and higher voltage at high motor speeds. The wye/delta switch are configured to balance the current to the first motor-generator and the second motor-generator 30, respectively, between two operational conditions: (i) when only using a motor-generator to drive an associated driveline assembly at speeds below a first threshold speed (e.g. 1200 rpm) and (ii) when using a motor-generator in conjunction with a power source to boost the driveline output at speeds greater than a second threshold speed (e.g. 2300 rpm).

Thus, the first wye/delta switch 70 and the second wye/delta switch 72 change how the power from the first and second bi-directional rectifier-inverters 64, 66 are utilized in the motor windings. As a result, the same power may be used at both conditions and the size/capacity of the first and the second bi-directional rectifier-inverters 64, 66 can be smaller since the first wye/delta switch 70 and the second wye/delta switch 72 are able to provide the rated current to the first and the second motor-generators 20, 30, respectively, at all conditions. Thus, the first wye/delta switch 70 and the second wye/delta switch 72 improve the efficiency of the operation of the marine propulsion system 10.

The marine propulsion system also provides a novel arrangement in which the power source, the clutch, the motor-generator, and the elastic coupling are arranged in-line as a single assembly. The assembly provides an effective clutched connection between the power source shaft and the output shaft of the driveline assembly in a compact, in-line arrangement.

While the present disclosure has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present disclosure, in its broader aspects, is not limited to the specific details and and illustrative examples shown and described. Accordingly, departures may be made from such details without departing from the spirit or scope of Applicant's general disclosure herein.

LIST OF ELEMENTS

Element Element
Number Name
10 marine propulsion system
12 marine vessel
14 first driveline assembly
16 second driveline assembly
18 first power source
20 first motor-generator
22 first clutch
24 first gearbox
26 first propulsion device
28 second power source
30 second motor-generator
32 second clutch
34 second gearbox
36 second propulsion device
38 first output shaft
40 first propeller shaft
42 first power source shaft
44 second output shaft
46 second power source shaft
48 second propeller shaft
50 first genset
52 second genset
54 electrical storage device
55 electrical grid
56 lines
58 electrical components
60 first rectifier
62 second rectifier
64 first bi-directional rectifier-inverter
66 second bi-directional rectifier-inverter
68 DC filters
70 first wye/delta switch
72 second wye/delta switch 82 first operator control
83 first input device
84 second operator control
85 second input device
86 user interface
88 control system
89 lines
90 inputs
92 displays
94 controller
96 memory
100 lines
102 lines
104 lines
106 arrangement
108 clutch housing
110 first end
112 second end
114 first mounting surface
116 flywheel housing
118 flywheel housing mounting surface
120 second mounting surface
122 flywheel
124 first shaft
126 elastic coupling
128 clutch pads
130 springs
132 second shaft
134 first end
136 second end
138 inner surface
146 motor housing
148 first end
150 second end
152 first motor mounting surface
154 rotor
156 stator
158 rotor shaft
160 first end
162 second end

What is claimed is:

1. A propulsion system for a marine vessel, comprising:
a first driveline assembly, comprising:
a first engine having a first engine shaft;
a first clutch connecting the first engine shaft to a first output shaft;
a first motor-generator operatively fixed to rotate with the first output shaft;
a first propulsion device connected to be driven by rotation of the first output shaft;
a second driveline assembly, comprising:
a second engine having a second engine shaft;
a second clutch connecting the second engine shaft to a second output shaft;
a second motor-generator operatively fixed to rotate with the second output shaft;
a second propulsion device connected to be driven by rotation of the second output shaft; and
a controller configured to operate the first driveline assembly and the second driveline assembly in a split mode wherein the first engine provides torque to drive the first output shaft via the first clutch without the first motor-generator providing torque to drive the first output shaft and the second motor-generator provides torque to drive the second output shaft without the second engine providing torque to drive the second output shaft, and wherein the first motor-generator provides electrical power to the marine vessel for consumption by electrical devices of the marine vessel.

2. The propulsion system of claim 1, further comprising a first genset that provides electrical power to drive the second motor-generator when the propulsion system is operating in the split mode.

3. The propulsion system of claim 1, wherein the first motor-generator directly provides electrical power to drive the second motor-generator when the propulsion system is operating in the split mode without an intermediate electrical storage device being positioned between the first motor-generator and the second motor-generator.

4. The propulsion system of claim 1, further comprising an electrical storage device, wherein the first motor-generator provides electrical power to the electrical storage device when the propulsion system is operating in the split mode.

5. The propulsion system of claim 1, further comprising a wye/delta switch associated with the second motor-generator, wherein the system is configured such that the second motor-generator is wye connected when using the second motor-generator to drive the second driveline assembly at rotational speeds below a first threshold speed and delta connected during all other motor-generator conditions.

6. The propulsion system of claim 1, further comprising a first operator control having a first input device and a second input device, wherein when the propulsion system is operating in the split mode, the controller associates the first input device with speed control of the first engine and associates the second input device with speed control of the second motor-generator.

7. The propulsion system of claim 1, wherein the controller is further configured to operate of the first driveline assembly in an accel assist mode wherein the first engine provides torque to drive the first output shaft via the first clutch and the first motor-generator applies additional torque to drive the first output shaft selectively when the first driveline assembly is accelerating.

8. The propulsion system of claim 7, wherein the first motor-generator applies additional torque to drive the first output shaft when the first driveline assembly is accelerating from idle speed or less than idle speed.

9. The propulsion system of claim 7, wherein the controller is further configured to operate of the first driveline assembly in a boost mode wherein the first engine provides torque to drive the first output shaft via the first clutch and the first motor-generator applies additional torque to drive the first output shaft such that a maximum rotational speed of the first output shaft in boost mode is greater than a maximum rotational speed of the first output shaft when only the first engine provides torque to drive the first output shaft.

* * * * *